United States Patent
Lewis et al.

(10) Patent No.: US 6,176,591 B1
(45) Date of Patent: Jan. 23, 2001

(54) INSTRUMENT PANEL WITH A RECIPROCABLE PLUNGER

(75) Inventors: Barry Lewis, West Glamorgan; Richard Keith Atkins; Malcolm John Livermore, both of Chelmsford, all of (GB)

(73) Assignee: Ford Motor Company, Dearborn, MI (US)

( * ) Notice: Under 35 U.S.C. 154(b), the term of this patent shall be extended for 0 days.

(21) Appl. No.: 09/304,476

(22) Filed: May 3, 1999

(30) Foreign Application Priority Data

May 2, 1998 (GB) .................................................. 9809499

(51) Int. Cl.[7] ..................................................... F21V 33/00
(52) U.S. Cl. ................. 362/85; 362/29; 362/489
(58) Field of Search ...................... 362/29, 85, 489

(56) References Cited

U.S. PATENT DOCUMENTS 5,171,080  * 12/1992  Bathurst ............................... 362/29 X
5,432,684  *  7/1995  Fye et al. ............................. 362/85 X

* cited by examiner

Primary Examiner—Stephen Husar
(74) Attorney, Agent, or Firm—Gregory P. Brown

(57) ABSTRACT

A plunger 20 which moves in and out relative to an illuminated panel 10 to operate a switch 18 is assembled from the front of the panel by pushing a shaft 24 with radial extensions 28 through a socket. The extensions yield to allow the shaft to pass through the socket and spring out once the shaft has passed through. A compressible gasket 32 is positioned between a shoulder 34 on the knob and the front face of the panel 10, to prevent light leaking from behind the panel, and to provide a restoring force to return the plunger to its start position after operation.

7 Claims, 2 Drawing Sheets

INSTRUMENT PANEL WITH A RECIPROCABLE PLUNGER

BACKGROUND OF THE INVENTION

1. Field of the Invention

This invention relates to an instrument panel with a reciprocable plunger for mounting through an aperture in a (preferably illuminated) instrument panel. The plunger can for example be used to re-set a function on the instrument panel, (e.g., the trip counter) but is not limited to any particular application.

2. Disclosure Information

It is known to mount a re-set knob behind the front face of an instrument panel with a return spring acting between a part of the knob and another fixed structure. This construction has to be assembled from behind the panel, which is disadvantageous. Also, it is difficult to prevent light leakage with such a construction.

It would be desireable to provide a reciprocable plunger that is easy to assemble and reduces light leakage when the plunger passes through an illuminated instrument panel.

SUMMARY OF THE INVENTION

According to the present invention, there is provided an instrument panel having a front face and a circuit board arranged behind and spaced from the front face, wherein a plunger is mounted in the panel through an aperture which includes a collar extending from the rear face of the panel into the space behind the panel, the plunger having a head and a shaft which has a cross section adapted to be a close sliding fit in the collar so that the plunger is guided for reciprocating movement by the engagement between the collar and the shaft and the head is unrestrained, the shaft having a radial projection which extends beyond the internal diameter of the collar, the projection and/or the collar being resilient to allow the part of the plunger with the projection to be forced through the collar, and a compressible gasket mounted on the plunger between a shoulder on the plunger and the instrument panel, the thickness of the gasket being such that it is in contact with the shoulder and with the front of the panel when the radial projection abuts the rear of the panel, and provides a restoring force which opposes movement of the plunger shoulder towards the panel, the circuit board including a switch which can be operated by movement of the plunger against the circuit board.

The instrument panel is preferably illuminated with illuminating light travelling within the panel front face (which will then be of a transparent or translucent material with an opaque coverlay on the front surface) and/or travelling in a space behind the front panel.

The use of a radial projection which allows the plunger to be pushed through the aperture from the front of the panel greatly assists assembly, in that the plunger can be assembled with the panel after other components have already been installed. Since the plunger only needs to be retained against a relatively low restoring force, this type of retention mechanism is satisfactory.

Use of a compressible gasket, both to provide a light seal and to provide a restoring force when the plunger is pressed in avoids the use of separate components to implement these two functions. The gasket is preferably slightly compressed when the plunger is in its non-operated condition, and is compressed still further when the plunger is pressed.

The radial projection can extend from a cylindrical rod-like part of the plunger, and can be tapered to ease insertion of the plunger through the aperture and to hinder removal. The rod-like part of the plunger can have a void section registering with the radial projection, arranged so that the resilient movement of the radial projection on insertion of the plunger into the aperture involves the temporary movement of part of the plunger into the void.

The aperture in the instrument panel is preferably in the form of a collar which extends from the rear face of the panel into the space behind the panel, to provide a support for the reciprocating movement of the plunger.

BRIEF DESCRIPTION OF THE DRAWINGS

The invention will now be further described, by way of example, with reference to the accompanying drawings in which.

DETAILED DESCRIPTION OF THE PREFERRED EMBODIMENTS

Figure 1:
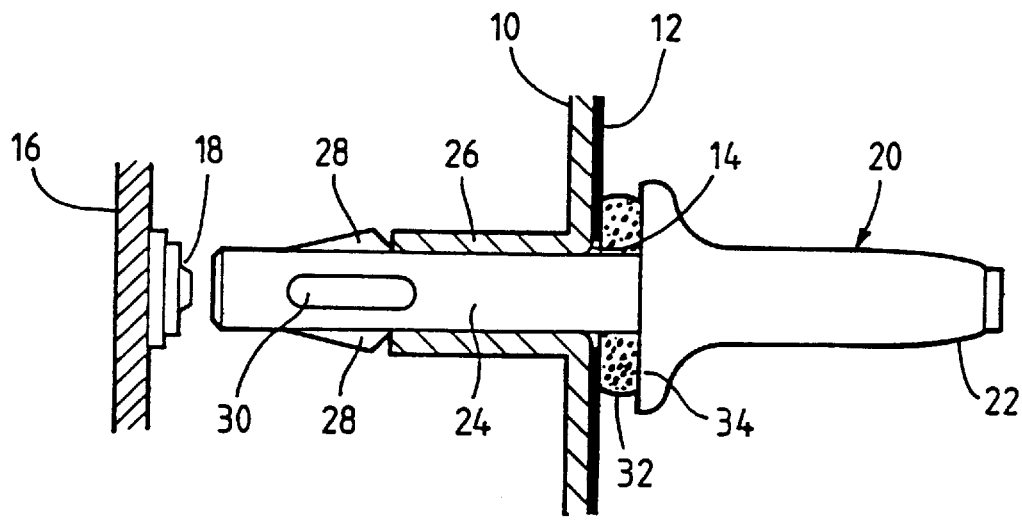
FIG. 1 is a cross section through an instrument panel, showing a plunger in accordance with the invention.

FIG. 1 shows an instrument panel 10 with an opaque coverlay 12 on the front. The coverlay prevents light from passing through the panel 10 (which will normally be translucent), except in places where the coverlay is cut away to allow transmission of light through for example the index marks around a speedometer dial and/or ideograms, letters, numbers or other markings which are to be illuminated.

The coverlay is also cut away where a component has to pass through the panel, and this is the case at 14 in FIG. 1.

Behind the panel 12 there is a circuit board, a part 16 of which can be seen in FIG. 1. This circuit board carries an electronic switch 18. This can for example be of the type where a carbon pad mounted on a silicone rubber membrane is normally spaced from a set of contacts on the board, but can be pressed against the contacts to provide an electrical connection between the contacts. The resilience of the rubber membrane will ensure that the pad is moved away from the contacts to break the connection when the pressure is removed. Such switches are known in themselves.

The switch 18 is to be operated by a plunger 20 which has a protruding knob at 22 and a shaft 24. The shaft 24 passes through a collar 26 formed integrally with the panel 10 and extending from the back of the panel. The shaft 24 has two diagonally opposite radial projections 28, and a through slot or void 30 in the region where the projections 28 are located.

A foam rubber or foam plastic gasket 32 is fitted beneath a shoulder 34 of the knob 22.

Figure 2:
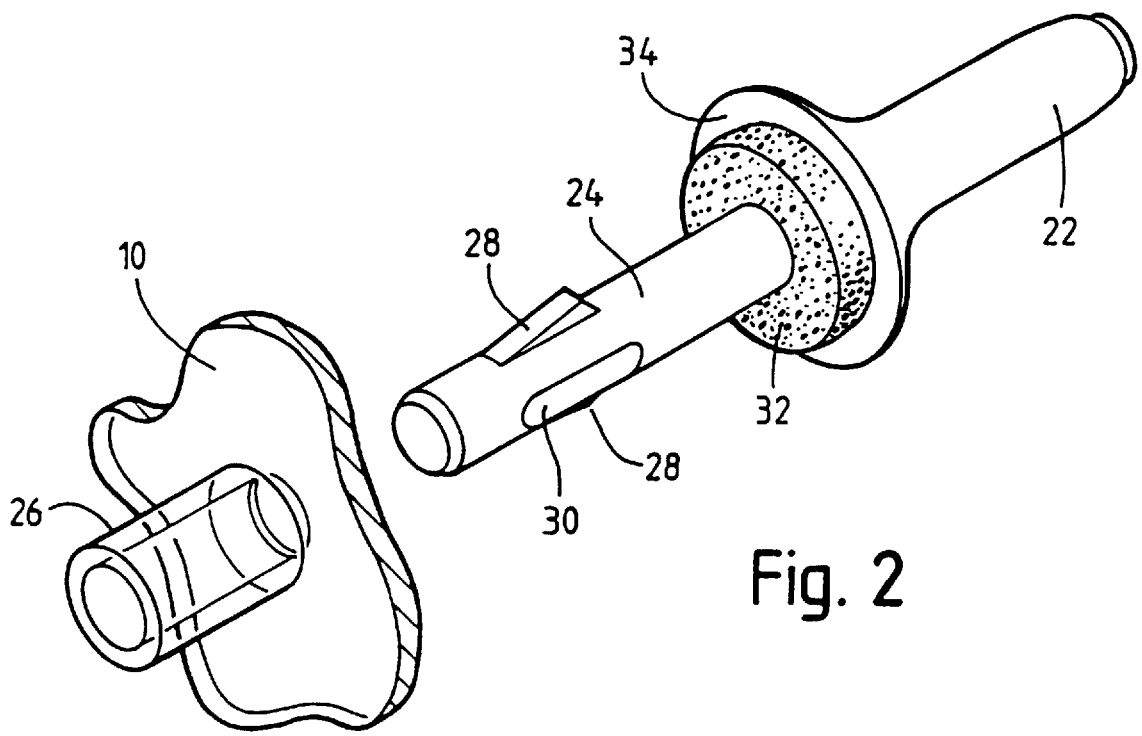
FIG. 2 is an exploded view of the plunger and part of the instrument panel, prior to assembly.
Figure 3:
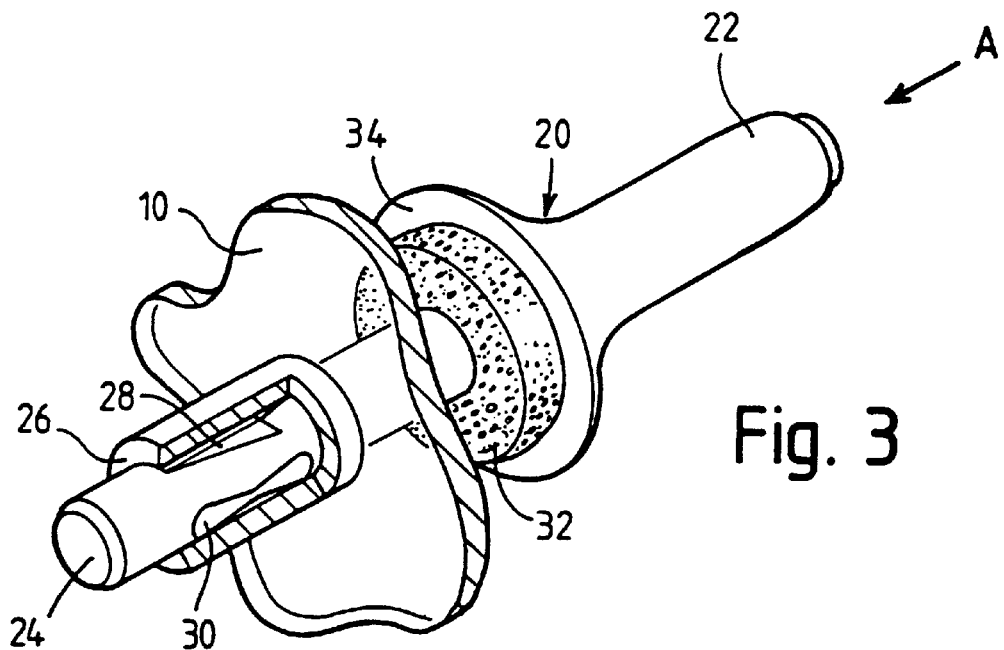
FIG. 3 is a view corresponding to FIG. 2, but showing an intermediate stage in assembly.
Figure 4:
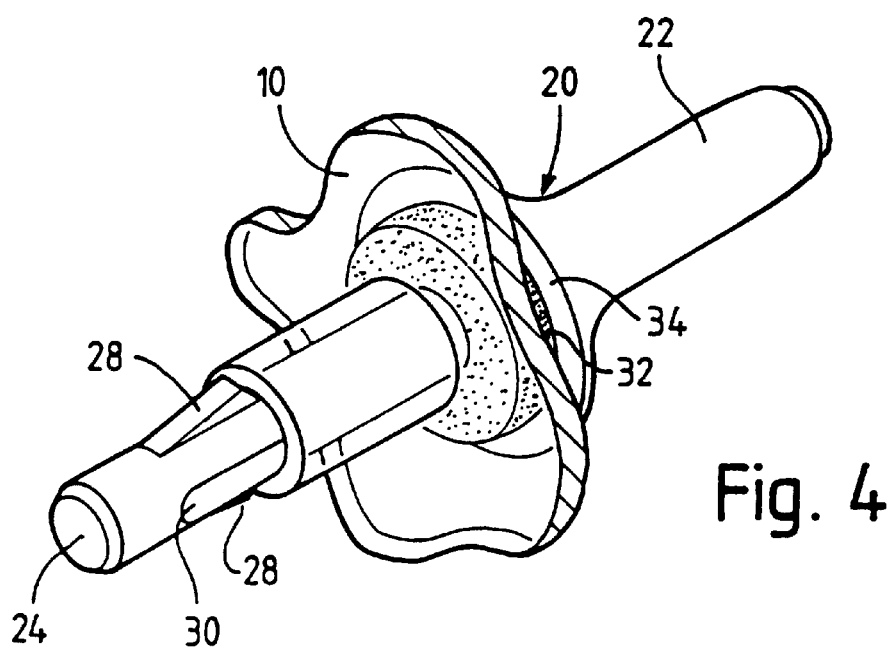
FIG. 4 shows the completed assembly.

To fit the plunger 20 in the instrument panel, the plunger is first offered up to the panel 10 in the position shown in FIG. 2. The leading end of the shaft 24 is inserted in the collar 26 and pushed. The edges of the aperture in the panel 10 ride on the tapered outer surfaces of the projections 28. Because of the void 30 in the centre of the shaft 24, the projections 28 can collapse inwards as shown in FIG. 3 on the application of pressure in the direction indicated by arrow A. Once the projections 28 have reached the end of the collar 26, they snap outwards as a result of the resilience of the material of the shaft 24, to take up the position shown in FIGS. 1 and 4. In this position the plunger is retained in the panel 10. It could possibly be removed by exerting a large withdrawal force on the knob 22, but the knob is smooth which will make it difficult to apply a large pulling force, and the faces of the projections 28 facing the knob 22 are steep, again to resist withdrawal.

In the normal position, illustrated in FIG. 1, the foam gasket 32 is slightly compressed. This will ensure that a good light seal is made between the gasket and the coverlay 12, so that no light will escape around the shaft 24 of the plunger.

To operate the plunger, the user merely presses the head of the knob 22. This compresses the gasket 32 still further, until the tip of the shaft 24 operates the switch 18. Releasing the knob 22 then allows the stored energy in the foam gasket 32 to return the plunger to its start position, limited by the abutment of the radial projections 28 with the bottom of the sleeve 26.

It will be seen that the gasket 32 both provides the necessary light seal and also the restoring force needed to return the knob 22 to its start position where the switch 18 is not being operated.

Because all the assembly is carried out from the front of the instrument panel, the inclusion of the reset knob does not need to interfere with other stages of the instrument panel assembly.

What is claimed is:

1. An instrument panel having a front face and a circuit board arranged behind and spaced from the front face, wherein a plunger is mounted in the panel through an aperture which includes a collar extending from the rear face of the panel into the space behind the panel, the plunger having a head and a shaft which has a cross section adapted to be a close sliding fit in the collar so that the plunger is guided for reciprocating movement by the engagement between the collar and the shaft and the head is unrestrained, the shaft having a radial projection which extends beyond the internal diameter of the collar, the projection being resilient to allow the part of the plunger with the projection to be forced through the collar, and a compressible gasket mounted on the plunger between a shoulder on the plunger and the instrument panel, the thickness of the gasket being such that it is in contact with the shoulder and with the front of the panel when the radial projection abuts the rear of the panel, and provides a restoring force which opposes movement of the plunger shoulder towards the panel, the circuit board including a switch which can be operated by movement of the plunger against the circuit board.

2. An instrument panel as claimed in claim 1 which is an illuminated panel.

3. An instrument panel as claimed in claim 2, wherein the panel front face is of a translucent material with an opaque coverlay on its front surface, and the illuminating light travels within the front face.

4. An instrument panel as claimed in claim 1, wherein the gasket is a foam gasket which is slightly compressed when the radial projection abuts the rear of the collar.

5. An instrument panel as claimed in claim 1, wherein the radial projection is tapered to ease insertion of the plunger through the aperture and to hinder removal.

6. An instrument panel as claimed in claim 1, wherein two diametrically opposite radial projections are provided.

7. An instrument panel as claimed in claim 6, wherein the rod-like part of the plunger has a void section registering with the radial projection, arranged so that the resilient movement of the radial projection on insertion of the plunger into the aperture involves the temporary movement of part of the plunger into the void.

* * * * *